Oct. 29, 1940.  W. H. ROWE  2,219,942
ELECTRICAL MEASURING INSTRUMENT
Filed March 30, 1939
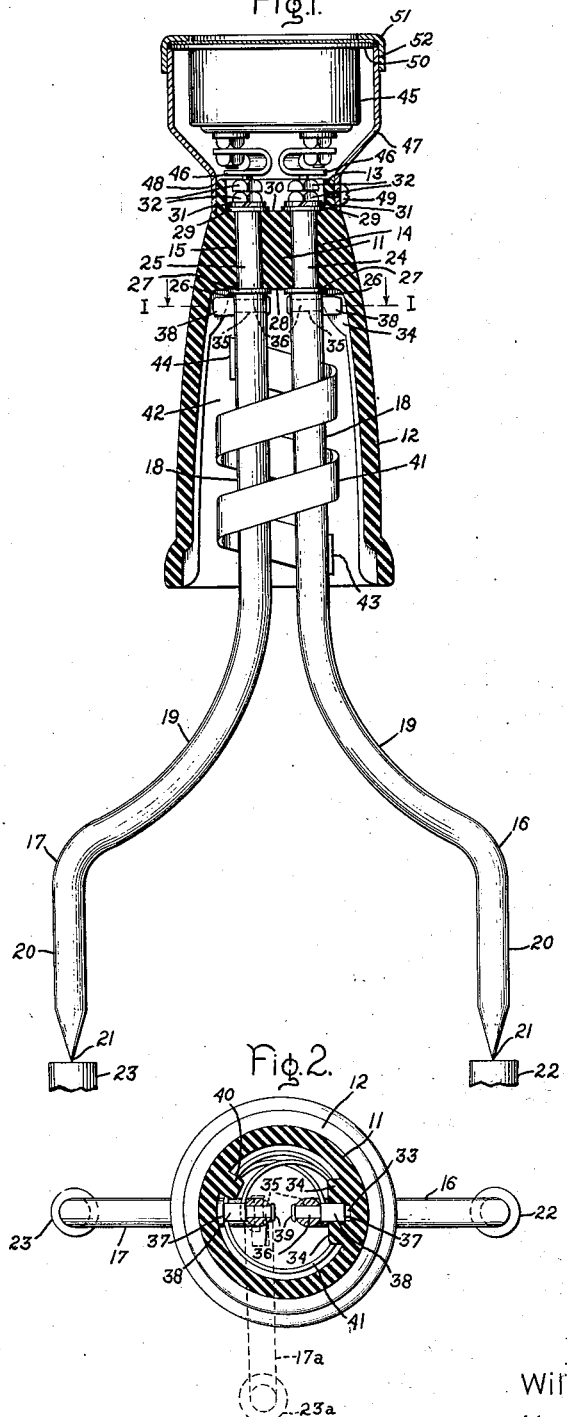
Inventor:
William H. Rowe,
by Harry E. Dunham
His Attorney Patented Oct. 29, 1940

2,219,942

UNITED STATES PATENT OFFICE 2,219,942

ELECTRICAL MEASURING INSTRUMENT

William H. Rowe, Lynn, Mass., assignor to General Electric Company, a corporation of New York Application March 30, 1939, Serial No. 264,924

4 Claims. (Cl. 175—183)

This invention relates to electrical measuring or indicating instruments and concerns particularly apparatus for testing the cells of storage batteries to determine their condition or degree of charge.

In the examination of storage batteries to determine the ability of a particular cell to supply heavy current demands of short duration, it is common practice to employ a testing device comprising a pair of spaced prods or contact points in fixed relation to each other with a resistor and voltmeter connected in parallel across the prods. In use, the operator grasps the handle of the device and presses the pointed prods into the terminals of the cells thereby causing a discharge of current through the resistor. The reading of the voltmeter under such circumstances provides an indication of the condition of the cell. If such a device is to be suitable for universal application in testing various sizes of storage batteries wherein the spacing between the terminals or poles of the individual cells is variable over a wide range, it must be so constructed that the prods are relatively movable to alter the spacing between the contact points. Furthermore, the resistor element should be positioned in such a manner that the operator will not suffer injury from burns caused by contact with the resistor when it is heated due to the battery discharge current during the testing operation. It is further desirable that the apparatus be simple and reliable in operation and of a rugged and inexpensive construction.

An object of my invention is to provide an improved testing instrument in which the spacing between the contact points may be altered in a simple and reliable manner.

Another object of my invention is to provide an improved battery testing instrument wherein the spacing between the prods or contact points is adjustable to render the device particularly adaptable for the examination and testing of storage batteries in which the spacing between the terminals of the individual cells of the different batteries is variable over a wide range.

A further object of my invention is to provide an improved portable testing instrument built as a unitary structure which is of simple and rugged construction and which may be manufactured and assembled in an economical manner.

A still further object of my invention is to provide an instrument of the above character wherein the operator is protected from burn injuries caused by direct contact with the resistor which becomes heated due to the passage of heavy current during the testing operation or cycle.

In accordance with my invention in its preferred form I mount each of the prods of the testing device in separate longitudinal bores or holes in the body portion and provide means whereby one of the prods may be rotated about an axis in the bore so that the spacing between the contact points may be made adjustable over a wide range. A handle, formed in general as a hollow cylinder, functions as a skirt depending from the body portion, and provides an inner chamber for enclosing the helical resistance element which encircles the upper end of the testing prods and which is connected between the prods. The condition of the cell is indicated by observing the reading of a voltmeter connected to measure the voltage drop across the resistor when the contact points are applied to the terminals of the cell under test.

My invention will be better understood from the following description when read in conjunction with the accompanying drawing, and its scope will be pointed out in the appended claims. Fig. 1 is an elevational view in cross section of one form of apparatus which may be used in carrying out my invention; and Fig. 2 is a cross sectional view of the apparatus taken along the line I—I of Fig. 1 and illustrates the movable prod adjusted to an intermediate position for varying the spacing between the contact points.

The same reference characters are employed to designate corresponding parts illustrated by the several views of the drawing.

Referring to Fig. 1 of the drawing, the numeral 11 designates the body portion of the device which may be made of wood, molded textolite, or other suitable insulating material, and from which extends a handle in the form of a skirt or depending portion 12 and an upper flange-like annular projecting portion 13. I prefer to make these parts as an integral structure and in the illustration shown they are formed as a single unit by a molding process. The body portion 11 is provided with two longitudinal holes or passageways 14 and 15. The testing prods 16 and 17, formed of a suitable electrically conducting material, comprise substantially straight or extended portions generally designated by the numeral 18, and these prods are bent outwardly from a point beginning near the bottom of the skirt or handle to form the offset or curved portions 19, thereby producing a divergent arrangement of the lower section of the prods with respect to the upper straight portions 18. The prods are then bent back at a point intermediate their extremities so that the free ends are arranged in substantially parallel relationship as indicated at 20. The free extremities of the prods are sharpened or pointed as at 21 to engage the battery cell terminals 22 and 23, or the terminals of other apparatus across which the potential is to be measured.

I provide means for connecting the prods in supported relation to the body portion 11 of the testing device. In the arrangement illustrated, the upper ends or extended portions of the prods 16 and 17 are each provided with a reduced diameter portion 24 and 25. The portion 25 is adapted to serve as a bearing journal and each portion is adapted to extend into the separate holes or passageways 14 and 15, respectively, of the body portion 11. By virtue of this reduced diameter portion a shoulder 26 is provided on each of the prods. A washer 27 is adapted to slide over the reduced diameter portion of each of the prods and is placed in position with one surface in contact with the shoulder 26 and the other in contact with the lower surface 28 of the body portion 11. A similar washer 29 is then placed over the upper end of each prod and positioned with its lower surface in contact with the upper surface 30 of the body portion 11. A lock washer or other suitable device 31 is then placed over the end of the prod and the nuts 32 are screwed down to apply pressure for maintaining the washers 27 and 29 in frictional engagement with the surfaces 28 and 30, respectively. The top nut 32 on the prods functions as a locking nut to maintain the desired pressure or adjustment. It will, of course, be understood that the frictional engagement between the prods and the support or body portion 11 may be secured by the omission of the washers described, but I prefer to employ the washers or their equivalent in order to distribute the frictional pressure over a greater area.

The supporting means described above permits relative rotation of the prods 16 and 17 whereby the straight portion 20 may move in a circular arc to adjust the spacing between the contact points 21. This feature renders the device particularly adaptable for those testing operations in which the spacing between the terminals of storage battery cells or the spacing between other electrical circuit points to be examined is subject to wide variations. Referring to both figures of the drawing, in the arrangement illustrated I provide a notch or depression 33 about the inner surface of the handle portion 12 which, for convenience as well as simplicity, may be formed by means of the integral ribs or projections 34 attached to the handle portion 12. To aid in the description of the apparatus at this point, I may conveniently refer to the prod 16 as the fixed prod, although my invention is not necessarily limited thereto, and the prod 17 as the movable, arc describing, or rotatable prod. Each of the prods is provided with a transversely disposed opening 35 which is adapted to receive the reduced diameter shank 36 of each of the pins 37. The portion 38 of larger cross-section thus forms a shoulder which abuts against the outer surface of the prods. The pins 37 are rigidly attached to the prods by peening or riveting the ends as shown at 39. The larger diameter portion 38 of the fixed prod 16 is adapted to rest in the notch or depression 33 and is thus firmly held against rotary movement.

Considering now the structural arrangement of the means for providing the arc describing movement of the contact portion 21 in a given plane, I provide a rib or projecting portion 40 which is similar to the projections 34 already described and which may be formed in a similar manner. The projecting portion 40 provides a stop against which the pin 37 abuts and prevents rotational movement in a clockwise direction but leaves the prod 17 free to rotate in a counter-clockwise direction about its axis in the longitudinal hole or passageway 15. The prod may thus be rotated to an intermediate position as indicated by the dotted portion at 17a to vary the spacing between the contact points 21 and thus make the device adaptable for testing various sizes of batteries wherein the spacing of the cell terminals is subject to wide variations. The frictional engagement of the washers 27 and 29 with the lower and upper surfaces 28 and 30, respectively, of the body portion 11 provides means for maintaining the rotatable prod 17 in any given intermediate position to which it is moved.

An important feature of the above described construction is that the elevation of all portions of the movable prod remains the same for all positions to which it may be rotated. Or stated in a different way, if the body portion and one of the prods is maintained in a given position and the movable prod rotated relatively thereto, the contact portions of the prods will always intersect a common plane regardless of the spacing between the contacts. In the preferred arrangement, the point of the arc describing prod, for any given adjustment, lies in a plane which is substantially perpendicular to and contains the point of the fixed prod.

In order to simulate actual service conditions of the cell to be examined, a flexible resistance element 41 in the form of a helical ribbon is positioned within the chamber 42 formed by the handle portion 12 and is connected to the prods 16 and 17 at the points 43 and 44 by welding or other suitable means. The handle 12 thus prevents the operator from suffering physical injury due to direct contact with the resistance element in its heated condition. The helical resistance element 41 is adapted to encircle the straight or extended portions 18 of the prods and this construction together with the flexibility offered by such a resistance element enables the prod 17 to rotate relative to the fixed prod 16.

To indicate the voltage drop across the resistance element 41 during the examination, for example, of a cell of a storage battery, I provide a voltmeter 45 having generally U-shaped resilient clips or terminals 46 which are maintained in contact with the upper ends of the prods 16 and 17. The voltmeter is preferably enclosed within a casing 47 which is provided with a reduced diameter or neck portion 48 adapted to encircle and engage the annular flange-like projecting portion 13. The casing may be secured to the portion 13 by screws 49 or other suitable means. The voltmeter or indicating instrument is further provided with a flange portion 50 which is adapted to rest on the upper end of the casing 47. A ring 51 of angular cross section is adapted to fit over the flange 50 and frictionally engage the edge of the flange and the outer surface of the casing as shown at 52. This provides a means of simple construction for positioning the voltmeter and maintaining its contacts or terminals 46 in firm engagement with the upper ends of the prods.

The method of assembly of the apparatus should be apparent from the foregoing description. With the casing and voltmeter removed, the prods 16 and 17, with resistor 41 attached as shown and with the washers 27 in the proper position, are inserted in the passageways 14 and 15, care being taken to position the pin 37 of the prod 16 in the notch 33 and the pin 37 of the prod 17 on the proper side of the projection 40 as shown in Fig. 2. The washers 29 and 31 are placed over the ends of the prods and the nuts 32 are then screwed down to produce the desired frictional pressure between the surfaces of the washers and the body portion. The voltmeter is then inserted in position and the apparatus is ready for use.

To operate the device it is merely necessary to move the rotatable prod 17 to give the desired spacing between the contact points 21, grasp the handle 12 to hold the contact points in engagement with the cell terminals, and observe the indication of the instrument 45 during the current discharged through the resistor.

The advantages to be derived from practicing my invention are not limited to those applications involving the examination of storage battery cells but it may also be found useful in those cases where it is desired to measure the potential between a plurality of points, such for example, as occurs in checking switchboard circuits and the like. In such a case the helical resistance element 41 is dispensed with and the voltmeter 45 must be one suitable to the potential range likely to be encountered.

While I have described the principle of operation of my invention together with the apparatus which I now consider to represent the best embodiment thereof, it will be obvious to those skilled in the art that changes and modifications may be made without departing from my invention, and I, therefore, aim in the appended claims to cover all changes and modifications as fall within the true spirit and scope of my invention.

What I claim as new and desire to secure by Letters Patent of the United States is:

1. A battery testing device comprising a body portion having a hole therein, a pair of prods connected to said body portion, one of said prods having its supported portion extending into said hole and journaled for rotation therein, a resistance element connected to said prods and encircling portions thereof, a voltmeter provided with resilient terminals, and means for maintaining said terminals in engagement with said prods.

2. A battery testing device comprising a body portion having a hole therein, a pair of prods connected to said body portion, one of said prods having its supported portion extending into said hole and journaled for rotation therein, and a voltmeter provided with resilient terminals, said terminals adapted to frictionally engage said prods.

3. A battery testing device comprising a body portion having a substantially vertical passageway therethrough, a pair of prods secured to said body portion, one of said prods having its supported portion extending into said passageway and journaled for rotation therein, a helical resistance element wound about said prods and electrically connected across said prods, and a voltage measuring instrument electrically connected to read the potential drop across said resistance element.

4. A battery testing device comprising a body portion having an aperture therein, a pair of contact prods connected to said body portion, one of said prods having its supported portion extending into said aperture and journaled for rotation therein, said rotatable prod having its contact portion offset with respect to its supported portion whereby the spacing between the contacts of said prods is varied upon rotation of said rotatable prod, and a helical resistance element encircling portions of said prods and electrically connected across said prods.

WILLIAM H. ROWE.